United States Patent
Desai et al.

(10) Patent No.: US 12,182,304 B1
(45) Date of Patent: Dec. 31, 2024

(54) SYSTEM AND METHODS FOR REROUTING PRIVATE DATA FROM A FIRST ELECTRONIC DEVICE TO A SECOND ELECTRONIC DEVICE

(71) Applicant: UIPCO, LLC, San Antonio, TX (US)

(72) Inventors: Snehal Desai, Richardson, TX (US); Stacy Callaway Huggar, San Antonio, TX (US); Noe Alberto Martinez, San Antonio, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 225 days.

(21) Appl. No.: 17/841,013

(22) Filed: Jun. 15, 2022

Related U.S. Application Data

(60) Provisional application No. 63/211,278, filed on Jun. 16, 2021.

(51) Int. Cl.
*G06F 21/62* (2013.01)

(52) U.S. Cl.
CPC ................. *G06F 21/6245* (2013.01)

(58) Field of Classification Search
None
See application file for complete search history.

(56) References Cited

U.S. PATENT DOCUMENTS

| | | | |
|---|---|---|---|
| 9,898,619 B1* | 2/2018 | Hadsall | G06F 21/6245 |
| 2017/0161506 A1* | 6/2017 | Gates | G09C 5/00 |
| 2020/0082125 A1* | 3/2020 | VanBlon | G06F 21/6245 |
| 2022/0100874 A1* | 3/2022 | Singh | G06F 21/6218 |
| 2022/0107774 A1* | 4/2022 | Gehler | G06F 21/32 |

* cited by examiner

*Primary Examiner* — Kaveh Abrishamkar
(74) *Attorney, Agent, or Firm* — Fletcher Yoder P.C.

(57) ABSTRACT

Systems and methods for privatized presentation of private data are provided. In certain embodiments, private data contained within received electronic data is identified. Based at least in part upon the identified private data, a determination is made as to whether privatized presentation of the private data should be performed. When the privatized presentation should be performed, a primary electronic device response including non-private data of the electronic data and an indication of a location of the private data in the electronic data is generated. The primary electronic device response is provided to a primary electronic device. The indication of the location of the private data is used to instruct the primary electronic device to refrain from presenting the private data. Instead, the private data is presented to a secondary electronic device tasked with presenting the private data in lieu of the primary electronic device.

20 Claims, 7 Drawing Sheets

```
<!DOCTYPE html>
<html>
<body>
<h1>THANKS FOR VISITING OUR SITE! </h1>
<p> YOUR BANK ACCOUNT NUMBER IS:
<PrivateData1></PrivateData1></p>
<p> PLEASE LET US KNOW IF YOU HAVE ANY
FURTHER QUESTIONS.</p>
</body>
</html>
```

```
<!DOCTYPE html>
<html>
<body>
<p> PrivateData1:122321</p>
</body>
</html>
```

FIG. 5

```
<!DOCTYPE html>
<html>
<body>
<h1>THANKS FOR VISITING OUR SITE! </h1>
<p> YOUR BANK ACCOUNT NUMBER IS:
<PrivateData1>122321</PrivateData1></p>
<p> PLEASE LET US KNOW IF YOU HAVE ANY
FURTHER QUESTIONS.</p>
</body>
</html>
```

```
<!DOCTYPE html>
<html>
<body>
<p> PrivateData1:122321</p>
</body>
</html>
```

FIG. 7

SYSTEM AND METHODS FOR REROUTING PRIVATE DATA FROM A FIRST ELECTRONIC DEVICE TO A SECOND ELECTRONIC DEVICE

CROSS-REFERENCE TO RELATED APPLICATION

This application claims priority to and the benefit of U.S. Provisional Application No. 63/211,278 entitled "Systems and Methods for Rerouting Private Data From a First Electronic Device to a Second Electronic Device," filed Jun. 16, 2021, which is hereby incorporated by reference in its entirety for all purposes.

BACKGROUND

The present disclosure relates generally to systems and methods for protecting private data presented by electronic devices. More specifically, the present disclosure relates to identifying and presenting private data in alternative ways to public data, to protect this private data.

Data protection is a growing concern among a large number of users. It is presently recognized that users may want increased protection of their private data. Further, users (e.g., blind persons) may desire expanded accessibility to their private data. As such, it may be beneficial to provide systems and methods that may both increase protection and improve accessibility of private data for a wide variety of users.

This section is intended to introduce the reader to various aspects of art that may be related to various aspects of the present techniques, which are described and claimed below. This discussion is believed to be helpful in providing the reader with background information to facilitate a better understanding of the various aspects of the present disclosure. Accordingly, it should be noted that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include retrieving user data, identifying private data in the user data, determining if the user data needs to be privatized, generating an indication of private data to cause switch over of presentation to a secondary electronic device, providing non-private data for presentation on a primary electronic device, and providing the private data for presentation on the secondary electronic device. In another embodiment, a method may include a primary electronic device receiving user data with private indication(s) from a server, sending the identified private data to a secondary electronic device, and sending a notification to a user to obtain the private data from the secondary device while blocking presentation of the private data at the primary electronic device.

Various refinements of the features noted above may exist in relation to various aspects of the present disclosure. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 5 illustrates example responses that reroute private data, sourced from a web server, in accordance with an embodiment described herein;

FIG. 7 illustrates an example of responses that reroute private data, where one response is sourced from a web server and a second response is sourced from a primary electronic device that receives the first response, in accordance with an embodiment described herein.

DETAILED DESCRIPTION

Figure 1:
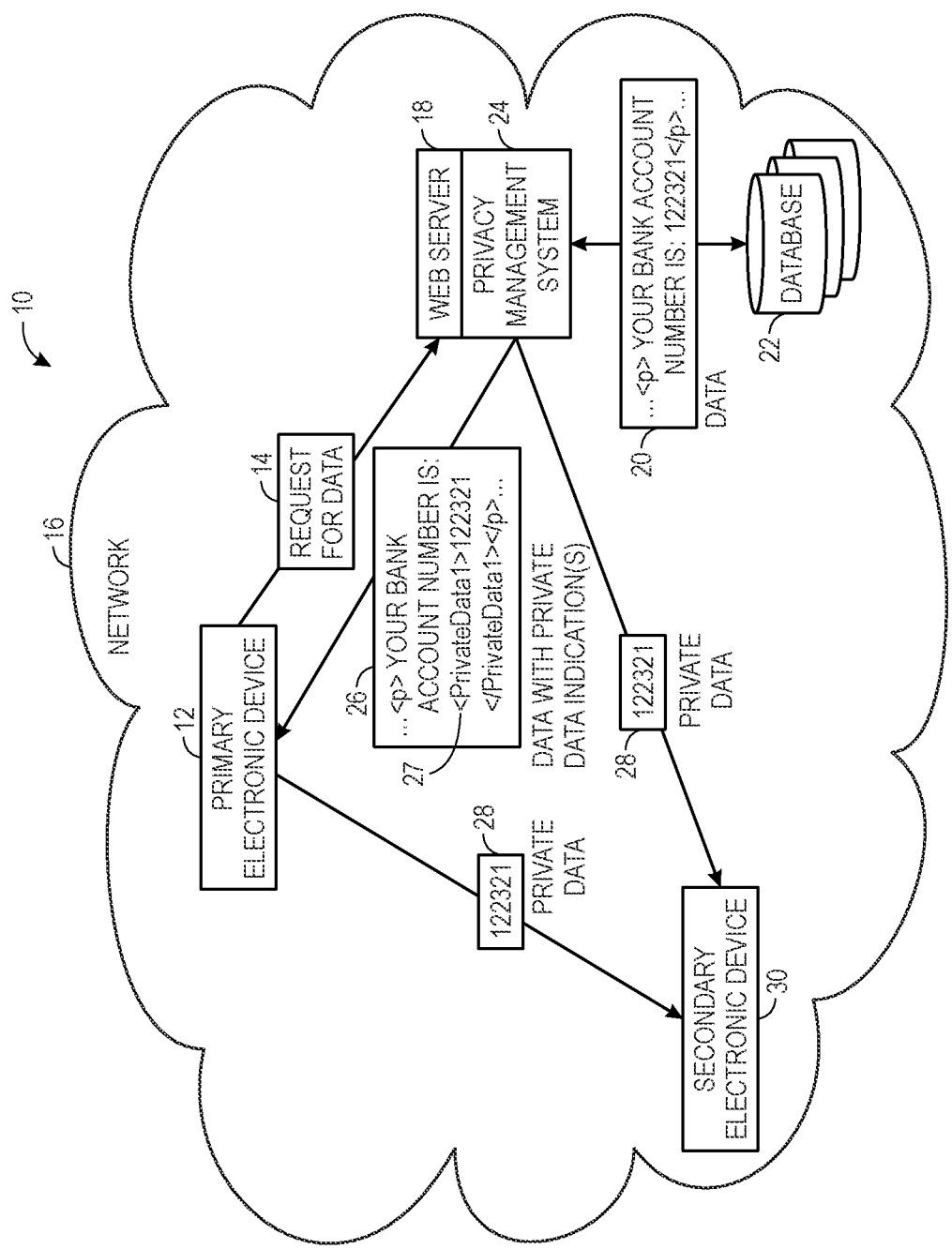
FIG. 1 illustrates a block diagram of a system for rerouting private data from a primary electronic device to a secondary electronic device, in accordance with an embodiment described herein.

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As data becomes more prevalent in the modern world, individuals across the globe are subjected to a greater risk of exposure of their private data to malicious entities. In particular, individuals that access data from a variety of locations (e.g., public areas) may unintentionally expose—via audible or visual means—said private data to third parties. Additionally, individuals may have their private data compromised if they misplace an electronic device containing their private data. On another note, the spread of data has underscored the need for increased accessibility. Individuals (e.g., blind persons) may not have the same physical capabilities for accessing private data as opposed to non-disabled persons. The provision of improved accessibility to private data may enable disabled individuals to have both adequate privacy protection and increased accessibility to their private data.

As such, it is presently recognized that individuals that access data containing private data may desire increased data protection and accessibility. Additionally, companies (e.g., insurance providers) may wish to provide improved data protection and improved accessibility to their customers.

With the foregoing in mind, systems and methods described below may be used for rerouting private data from a primary electronic device to a secondary electronic device. The embodiments disclosed herein may increase privacy for users in various situations. For example, a user in a public area may access private data via a second electronic device (e.g., a smartphone) that may be less visible to malicious entities than the user's first electronic device (e.g., a laptop). In another example, a user may avoid compromising their private data to malicious entities when they misplace their primary electronic device, as the private data may not be accessible via the primary electronic device since it has been rerouted to the user's secondary electronic device. Continuing, the embodiments disclosed herein may improve accessibility for disabled individuals. For instance, the rerouting of private data from a primary electronic device to a secondary electronic device may provide improved accessibility for a disabled individual. In one example, the secondary electronic device (e.g., Braille watch) may be configured to display private data in Braille, which may improve accessibility for blind persons.

With the foregoing in mind, rerouting private data from a first electronic device to a secondary device may thus provide both increased privacy protection and accessibility features to various users. Additional details regarding systems and techniques for rerouting private data will be discussed below with reference to FIGS. 1-7.

To reroute private data from a first primary device to a secondary electronic device, present embodiments described herein may use a privacy management system to identify and tag private data. That is, in some embodiments the privacy management system may interact with various devices via a network to receive data, analyze the data (e.g., to identify private data), tag private data within the data, and transmit the public data alongside the private data to a primary electronic device and a secondary electronic device, respectively. Thus, the public data may be presented by the primary electronic device and the private data may be presented by the secondary electronic device. In other embodiments, a primary electronic device of the one or more electronic devices may receive the public data with tagged private data and transmit the tagged private data directly to a secondary electronic device of the one or more electronic devices, enabling the second electronic device to present the private data in lieu of the primary electronic device.

By way of introduction, FIG. 1 illustrates a block diagram of a system 10 for transmitting data with private data indication(s) 26 to a primary electronic device 12 and sending private data 28 to a secondary electronic device 30 in accordance with certain embodiments disclosed herein. A web server 18 may receive a request for data 14 via a network 16 from the primary electronic device 12. The web server 18 may query for user data 20 from a database 22. A privacy management system 24 may receive the data 20. The privacy management system 24 may analyze the data 20 for private data 28. During the analysis, the privacy management system 24 may insert one or more indications 27 of private data 28 in the data 20. In one example, the privacy management system 24 may insert private data indication(s) 27 (e.g., HTML tags) in the data 20 where the privacy management system 24 identifies the presence of private data 28. The privacy management system 24 may then send the data with private data indication(s) 26 to the primary electronic device 12. In some embodiments, the privacy management system 24 may send private data 28 directly to the secondary electronic device 30 via the network 16. In other embodiments, the primary electronic device 12 may instead send the private data 28 to the secondary electronic device 30 via the network 16.

The network 16 may include one or more collections of computing systems, the Internet, an Intranet system, or the like. The network 16 may facilitate communications between the primary electronic device 12, web server 18, privacy management system 24, database 22, secondary electronic device 30, and the like. The network 16 may use various communication protocols to facilitate the communications. The communication protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

Continuing, the primary electronic device 12 may be an electronic device that may include presentation devices open to the public (e.g., large monitors, external speakers, etc.). For example, the primary electronic device 12 may be a computing system such as a desktop computer, a laptop computer, an implanted computer, a smart speaker, and the like. The primary electronic device 12 may have access to the network 16 directly (e.g., through a specific virtual private network (VPN) connection) or indirectly (e.g., via a public network and with certain security protocols). During access to a service provided by an organization via the network 16, personal data (such as name, address, phone number, email address, age, and social security number) associated with the user of the primary electronic device 12 may be utilized (i.e., recorded, verified, processed, analyzed, modified, and modeled) by the organization using a web server 18. Furthermore, the primary electronic device 12 may transmit a request for data 14 to a web server 18 via the network 16.

The web server 18 may be a server operated by a third-party organization (e.g., any web-host that provides a service that may present private data, such as a bank, an insurance company, or a financial group). For example, the web server 18 may be a private server, such as one on a local area network (LAN) that includes a variety of computing and server devices including but not limited to, switches, servers (e.g., processors), storage (e.g., memory) and routers. The web server 18 may include restrictions and access rules established to relegate access to selected users (e.g., clients, employees, third-party service providers, regulatory representatives). The organization may use the web server 18 to provide a variety of services for the clients. In some embodiments, the web server 18 may be off-premises (e.g., in a cloud network or the like). The web server 18 may include service/application servers, data servers, databases, and other server devices such as gateways, switches, and routers.

In some embodiments, the web server 18 may be communicatively coupled to one or more databases 22 or any other suitable storage device, which may store user data 20. The databases 22 may be any suitable storage component that stores data that may be categorized as having a higher priority or may be stored in the databases 22. Continuing, the user data 20 may contain data pertaining to a user, such as personal information, account information, banking information, insurance data, and the like. The user data 20 may be stored in various file formats, such as HTML, plain text, widely-used proprietary formats (e.g., Microsoft™ Word or Microsoft™ Excel), PDF, XML, Rich Text Format, Open Document Text, and the like.

The privacy management system 24 may include any suitable computer device, such as a general-purpose personal computer, a laptop computer, a tablet computer, a mobile computer, and the like. The privacy management system 24 may include various types of computer tasks and operations. For example, the privacy management system 24 may include a communication component, a processor, a memory, a storage, input/output (I/O) ports, a display, and the like. The communication component may be a wireless or wired communication component that may facilitate communication between the privacy management system 24 and various other computing systems via a network, the Internet, or the like.

The secondary electronic device 30 may be an electronic device that provide a more private presentation to the user. For example, the secondary electronic device 30 may be a computing system such as a smartphone, a mobile tablet, a wearable computer, an implanted computer, and the like. Further, the secondary electronic device 30 may be a computing system that aids with user accessibility (e.g., a Braille watch). The secondary electronic device 30 may have access to the network 16 directly (e.g., through a specific virtual private network (VPN) connection) or indirectly (e.g., via a public network and with certain security protocols). In some embodiments, the secondary electronic device 30 may be communicatively coupled with the primary electronic device 12 (e.g., through the network 16, Bluetooth®, Wi-Fi, etc.). Further, this communicative coupling may be protected via certain network security features, such as by establishing a VPN connection, encryption, etc. between the primary electronic device 12 and the secondary electronic device 30. In this way, the secondary electronic device 30 may directly receive private data 28 from the primary electronic device 12. Continuing, the secondary electronic device 30 may be configured to present the received private data 28. For example, the secondary electronic device 30 may convert the private data 28 into a more-private accessible format (e.g., Braille) for disabled users. In other embodiments, the secondary electronic device 30 may provide audible, visual, and/or haptic presentation of the private data 28. For instance, the secondary electronic device 30 may be connected to a form of earphone (e.g., headphones, earbuds, etc.) by which the secondary electronic device 30 may audibly transmit the private data 28. In one instance, the secondary electronic device 30 may visually display the data in a text format. In some instances, haptic presentation may be provided by the secondary electronic device 30, such as via the use of a Braille watch or other device that provides a touch-based output that can be interpreted by a use.

Keeping the foregoing in mind, the privacy management system 24 may receive the requested data from the database 20. The privacy management system 24 may identify that the accessed data 20 for privatized presentation. For example, the privacy management system 24 may traverse the received data and identify data patterns or other characteristics of the data as indicating private data. For example, a 3-2-4 format of number may likely indicate a social security number that should be privatized. Further, a number string with certain known leading digits may likely indicate a credit or debit card number that should be privatized.

To trigger privatized presentation of the data, the privacy management system 24 may generate indication(s) of private data 27 and incorporate the indications 27 into the data 20, thus generating data with private data indication(s) 26. In this way, the privacy management system 24 may provide the data with private data indication(s) 26 to the primary electronic device 12, and—in some embodiments—the privacy management system 24 may provide the private data 28 to the secondary electronic device 30.

Figure 2:
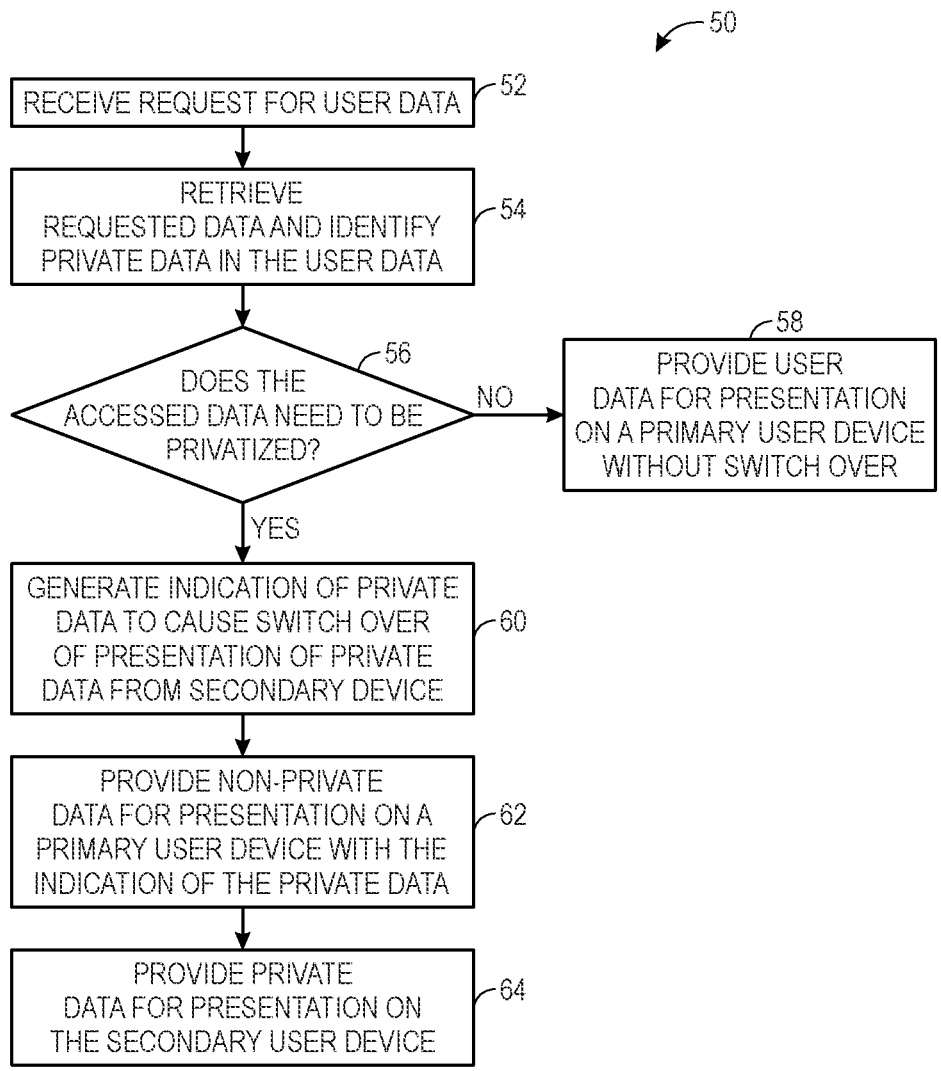
FIG. 2 illustrates a flow chart of a method for privatizing and rerouting accessed data, in accordance with an embodiment described herein.

FIG. 2 illustrates a flow chart of a process 50 for privatizing and rerouting accessed data. Although the method 50 described in FIG. 2 is described in a particular order and as being performed by the privacy management system 24, it should be understood that the process 50 may be performed in any suitable order and by any suitable computing device or application.

At block 52, the privacy management system 24 may receive a request for user data 14 from a primary electronic device 12. Facilitating the request may involve the primary electronic device 12 providing one or more forms of authentication such as, but not limited to, a decryption key, a password, a personal identification number (PIN), biometric authentication, a username, or the like. As discussed above, the user data 14 may include private data that is ideally presented in a more-private manner than public data.

After retrieving the request for user data 14, at block 54 the privacy management system 24 may query the database 22 or another suitable storage component to retrieve the user's data 20. Further, the privacy management system 24 may identify private data 28 within the retrieved data 20. To do so, the privacy management system 24 may determine if one or more of the following are in the data 20: personal information (e.g., name, address, phone number, email address, age, and social security number), account information (e.g., a decryption key, a password, a personal identification number (PIN), biometric authentication, a username), banking information (e.g., an account number, an amount of savings), and the like. This can be done by identifying content of the data known as private data 28, identifying patterns in the data known to be associated with private data 28, etc.

After receiving the data 20 from the one or more databases 22, the privacy management system 24 may determine if the accessed data 20 needs to be privatized at block 56. That is, the privacy management system 24 may determine that the user is at risk of exposing private data 28 to malicious entities. To make said determination, the privacy management system 24 may optionally use data gathered from presentation environment sensors (e.g., on the primary electronic device 12 and/or the secondary device 30) to identify whether private presentation may be desirable. In some embodiments, this determination may be based upon other entities proximate to the presentation devices. For example, the sensory data may include visual data (e.g., from a camera), location data, network data, and the like. In one embodiment, the privacy management system 24 may determine that the accessed data 20 needs to be privatized if visual or other sensory data indicates that a certain number of persons other than the data requesting user above a certain threshold number are within a certain range of the primary electronic device 12 and/or secondary device 30.

In some embodiments, a presentation type may be used in this determination. For example, when an audible screen reader is active, perhaps presentation may be more easily intercepted by a nefarious actor than visual presentation. In such a case, the determination to activate privatized presentation may be based, at least in part, upon the type of presentation provided by the primary electronic device 12.

In another embodiment, the privacy management system 24 determine if privatization is needed based upon environmental factors. For example, if location data shows that the primary electronic device 12 and/or secondary electronic device 30 are in a public location, an unfamiliar location (i.e., a location outside where a user normally accesses data), or the like. On a similar note, in some embodiments the privacy management system 24 may determine that the data 20 needs to be privatized if the network data indicates that the primary electronic device 12 or secondary device 30 are connected to a public network, an unfamiliar network (i.e., a network that the device(s) 12 and 30 are not usually connected to), and the like. In some embodiments, the privacy management system 24 may generate a risk score based upon its analysis of both the data 20 and the gathered data from the electronic devices 12 and 30. The privacy management system 24 may privatize the data 20 if the generated risk score is determined to be above a predetermined threshold.

In some embodiments, the privacy management system 24 may determine whether privatized presentation should occur based upon a level of sensitivity of the contents of the data. For example, data that is frequently used in fraud, such as financial account numbers may be more sensitive than other private information that identifies a user, such as a license plate number, etc. Thus, the level of sensitivity of the contents may be used to identify whether privatized presentation is warranted. In some embodiments, the mere existence of private content may result in privatized presentation of the private content.

Continuing, in some embodiments the privacy management system 24 may factor in previously set privacy settings in its determination of privatization. The privacy management system 24 may retrieve the settings from the database 22 or any other suitable form of storage. The settings may be altered by either the user or an administrator of the privacy management system 24. The settings may specify if certain portions of the accessed data 20 needs to be privatized or not, such as but not limited to personal information, account information, banking information, and the like. Furthermore, the settings may alter weights given to the sensory data and data 20 analyzed by the privacy management system 24 in its generation of a risk score. For example, the settings may indicate that visual data should influence the magnitude of the risk factor more than location data (or vice versa). Continuing, in some embodiments the user or the administrator of the privacy management system 24 may set what data 20 the privacy management system 24 may flag as private data 28 that needs to be privatized. In one instance, the user or administrator may set the privacy management system 24 to not flag a name of the user as private data 28, while on the other hand, the user or the administrator may set the privacy management system 24 to flag an account number of the user as private data 28.

If the privacy management system 24 determines that no data 20 needs to be privatized, the privacy management system 24 may provide unmodified user data 20 for presentation on the primary electronic device 12 at block 58. This may be done without providing any presentation switchover to a secondary electronic device 30.

On the other hand, if the privacy management system 24 does determine that the data 20 needs to be privatized, the privacy management system 24 may generate one or more indication(s) of private data 27 at block 60. The indication(s) 27 may be in the form of HTML tags, XML tags, plain text, and the like. In one example, the privacy management system 24 may insert certain HTML tags around a section of the data 20 identified as private data 28. In this way, the primary electronic device 12 may perform a switchover to a secondary electronic device 30 when the primary electronic device 12 detects the certain HTML tags.

In one example, when the primary electronic device 12 detects the private data indication(s) 27, the primary electronic device 12 may cease presenting the data, with private indication(s) 26, thus refraining from presenting the private data. Instead, the private data 28 is presented on a secondary electronic device 30. The discussion of FIG. 3 will provide further details concerning the primary electronic device's 12 interactions with the data with private data indication(s) 26. To facilitate this privatized presentation rerouting, at block 62, the privacy management system 24 may send the data with private data indication(s) 26 to the primary electronic device 12 after inserting the indication(s) of private data 27 in the data 20.

The private data is provided to the secondary electronic device 30 for presentation (block 64). For example, in some embodiments, the privacy management system 24 may provide the identified private data 28 to the secondary electronic device 30 for presentation at the secondary electronic device 30. In some embodiments, the primary electronic device 12 may provide the private data to the secondary electronic device 30. In such a scenario, the privacy management system 24 need not be communicatively coupled to the secondary electronic device 30.

As discussed above, the privacy management system 24 may receive a request for data 14 from a primary electronic device 12. In some embodiments, the privacy management system 24 may send data with private data indication(s) 26 to the primary electronic device 12. The primary electronic device 12 may then identify the private data indication(s) 27 and perform a switchover to a secondary electronic device 30. That is, the primary electronic device 12 may cease display of the data with private data indication(s) 26 while a user accesses the private data 28 on the secondary electronic device 30.

Figure 3:
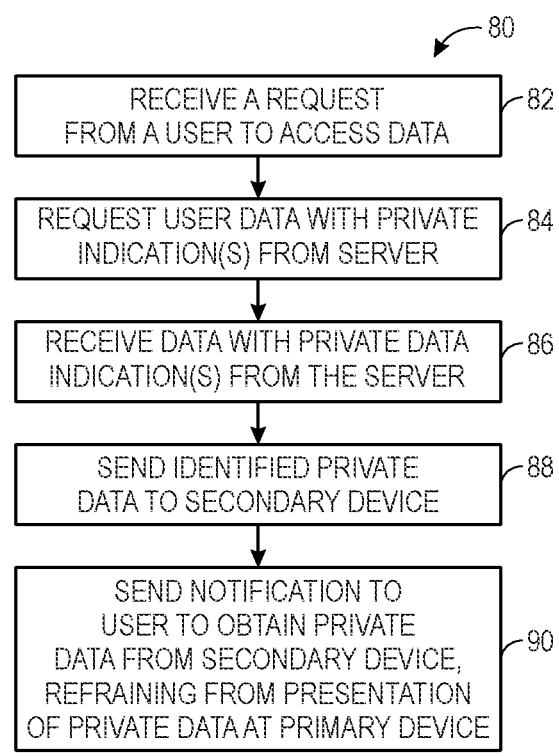
FIG. 3 illustrates a flow chart of a method for receiving, rerouting, and blocking presentation of private data, in accordance with an embodiment described herein.

Turning now to a discussion of the presentation of the public and private data, FIG. 3 illustrates a flow chart of a process 80 for receiving and rerouting presentation of private data 28. Although the process 80 described in FIG. 3 is described in a particular order and as being performed by the primary electronic device 12, it should be understood that the process 80 may be performed in any suitable order and by any suitable computing device or application.

At block 82, the primary electronic device 12 may receive a request from a user to access data 20. The primary electronic device 12 may receive the request from the user via touch, voice, or any other suitable interaction with the user. In some embodiments, the request may be handled by an application in the primary electronic device 12. In some embodiments, an organization (e.g., an insurance company) may administer the application. The request to access data may specify what data is to be accessed. For example, the user may request data such as personal information (e.g., name, address, phone number, email address, age, and social security number), account information (e.g., a decryption key, a password, a personal identification number (PIN), biometric authentication, a username), banking information (e.g., an account number, an amount of savings), and the like.

After receiving the request from a user to access data, the primary electronic device 12 may parse the request from the user and subsequently transmit a request for user data 14 to a web server 18 at block 84. The primary electronic device 12 may then receive user data with private indication(s) 26 from the web server 18 at block 86. In some embodiments, the primary electronic device 12 may analyze the received data with private indication(s) 26 to identify the private indication(s) 27. That is, the primary electronic device 12 may isolate the private indication(s) 27 from the data with private indication(s) 26. For instance, the electronic device 12 may be configured with instructions for analyzing and identifying private indication(s) 27. In one embodiment, the primary electronic device 12 may be configured to identify certain HTML tags that indicate private data. In some embodiments, the primary electronic device 12 may store the isolated private indication(s) 27 in a file (e.g., an HTML file, a .txt file, etc.).

At block 88, an entity (e.g., the primary electronic device 12 or the privacy management system 24) may send the identified private data 28 to a secondary electronic device 30. The private data 28 may be transmitted via the network 16, Bluetooth®, Wi-Fi, or any other suitable communication protocol.

After sending the identified private data 28 to the secondary electronic device 30, at block 90 the primary electronic device 12 may send a notification to the user to obtain the private data 28 from the secondary device 30. The notification may be visual, audible, haptic, or presented in any other suitable means. In some embodiments, the visual notification may be in the form of a text overlay on the primary electronic device 12. On the other hand, the primary electronic device 12 may emit an audible notification that indicates to the user that private data 28 may only be accessed via the secondary device 30. In some embodiments, both types of notifications may be presented to the user. Further, the notification may be presented to the user via the secondary device 30 as opposed to the primary electronic device 12. For example, the secondary electronic device 30 may generate a push notification, either audibly or visually, to alert the user that private data 28 may be obtained from the secondary electronic device 30.

Additionally, the primary electronic device 12 may refrain from presentation of private data 28 at the primary electronic device 12 itself. The primary electronic device 12 may block presentation visually, audibly, or by any other suitable means. In some embodiments, the visual block may be a text overlay over the private data 28 that indicates that the private data 28 is censored. In other embodiments, the primary electronic device 12 may present edited user data 20 to the user. For instance, the primary electronic device 12 may insert filler text in parts of the user data 20 that were recognized as private data 28. The filler text may indicate that private data 28 has been substituted. Similarly, the primary electronic device 12 may block audio transmission of the private data 28. The primary electronic device 12 may mute the identified private data 28. In some embodiments, the primary electronic device 12 may audibly transmit filler noise in place of the private data 28 during audio transmission. In other embodiments, the primary electronic device 12 may cease transmission of the data 20 entirely and solely notify the user to access the private data on the secondary electronic device 30. Additionally, the primary electronic device 12 may grant further access to the data 20 if the user provides an indication to the primary electronic device 12 to do so (e.g., pressing a certain key on a keyboard, saying a certain word, etc.).

Figure 4:
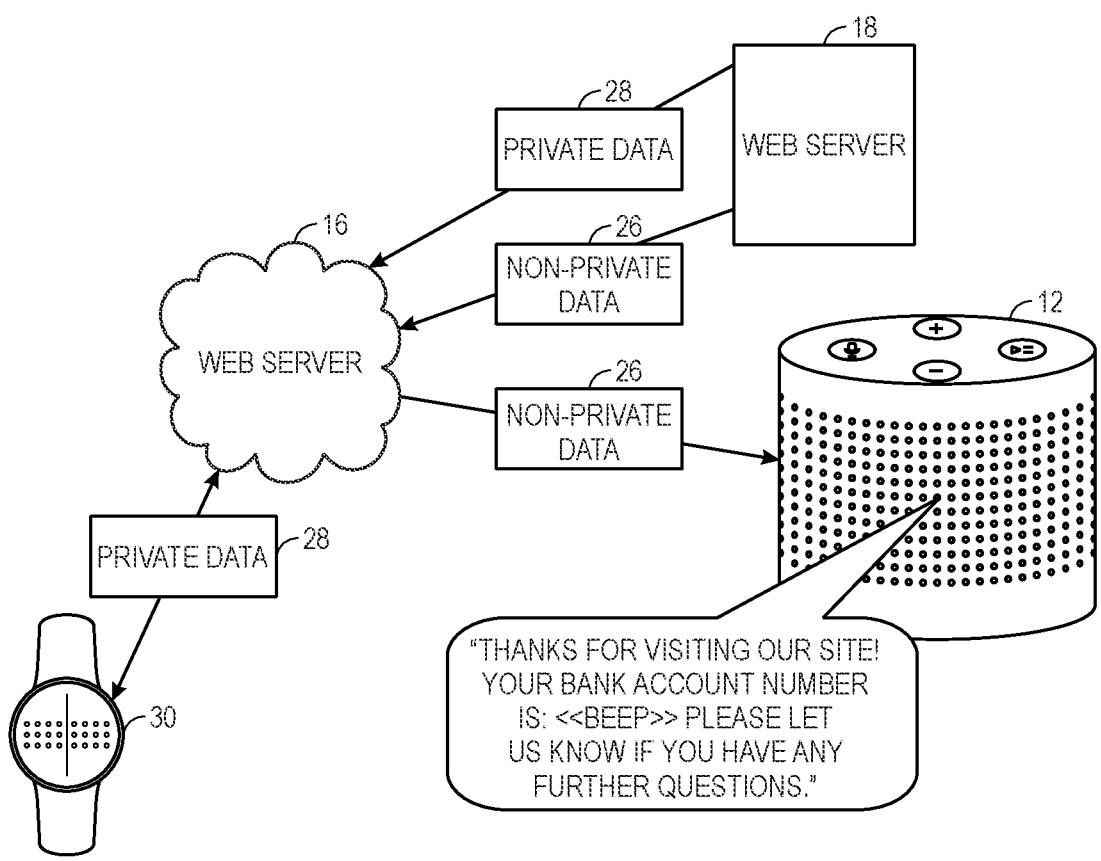
FIG. 4 illustrates an embodiment of a privacy management system presenting rerouted private data and non-private data, in accordance with an embodiment described herein.

The processes 50 and 80 of FIGS. 2 and 3 may be implemented in several embodiments that use one or more components of the system 10 of FIG. 1. By way of example, FIG. 4 illustrates an embodiment of a privacy management system rerouting private data and non-private data which may include embodiments of the system 10 of FIG. 1 in accordance with the method 50 described in the discussion of FIG. 2. Additionally, FIG. 5 illustrates an embodiment of responses from a webserver 18 to a primary electronic device 12 and a secondary electronic device 30—which may be embodiments of the system 10 of FIG. 1—in accordance with the embodiment as described in FIG. 4.

FIGS. 4 and 5 depict an embodiment that incorporates embodiments of system 10 of FIG. 1 to implement the process 50 as described in the discussion of FIG. 2. In FIG. 4, a web server 18 may send non-private data 26 and private data 28 to a primary electronic device 12 and a secondary electronic device 30, respectively, via a network 16. In this embodiment, the primary electronic device 12 may be a computing device such as a smart speaker. The primary electronic device 12 may receive a response from the webserver 18.

As shown in FIG. 5, the response may contain the non-private data 26 without private data 28 in HTML format. That is, in this embodiment the private data 28 may be substituted with a private data indication 27, but without the actual private data (e.g., in the form of an HTML tag, etc.). As a result, the primary electronic device 12 may audibly output the non-private data 26 while outputting a transition indication (e.g., a beep) in place of the private data 28 to indicate to an audience that presentation of the private data has switched to the secondary electronic device 30.

The secondary electronic device 30 may receive a response from the web server 18 as well. The secondary electronic device 30 may be a device that can provide a more privatized presentation of data for a user. For example, in the current embodiment the secondary electronic device 30 is a Braille watch to an individual that touches the haptic zone of the Braille watch. As may be appreciated this is a much more privatized presentation device than audible presentation of data via a smart speaker, as the presentation reaches a more limited audience (e.g., one person touching the watch) in comparison to all persons within hearing range of the smart speaker.

As displayed in FIG. 5, the secondary electronic device 30 response 28 may contain the private data indication 27, for example in an HTML format or any other format interpretable by the secondary electronic device 30. After receiving the response from the webserver 18, the secondary electronic device 30 may parse the response 26 to present the private data 28 in a more-privatized way. In some embodiments, further accessibility constraints may be factored in to the presentation. For example, when a screen reader is used on the primary electronic device 12 (presumably for a sight-impaired user), presentation via the secondary electronic device 30 may be limited to a complementary accessible format for the user (e.g., haptic Braille presentation), while refraining from other presentation formats (e.g., visual display) that are not suitable alternatives to the accessibility formats of the primary electronic device 12. Thus, the accessibility settings of the primary electronic device 12 may dictate possible secondary electronic devices 30 or accessibility formats that may be used for privatized presentation by the secondary electronic device 30.

Figure 6:
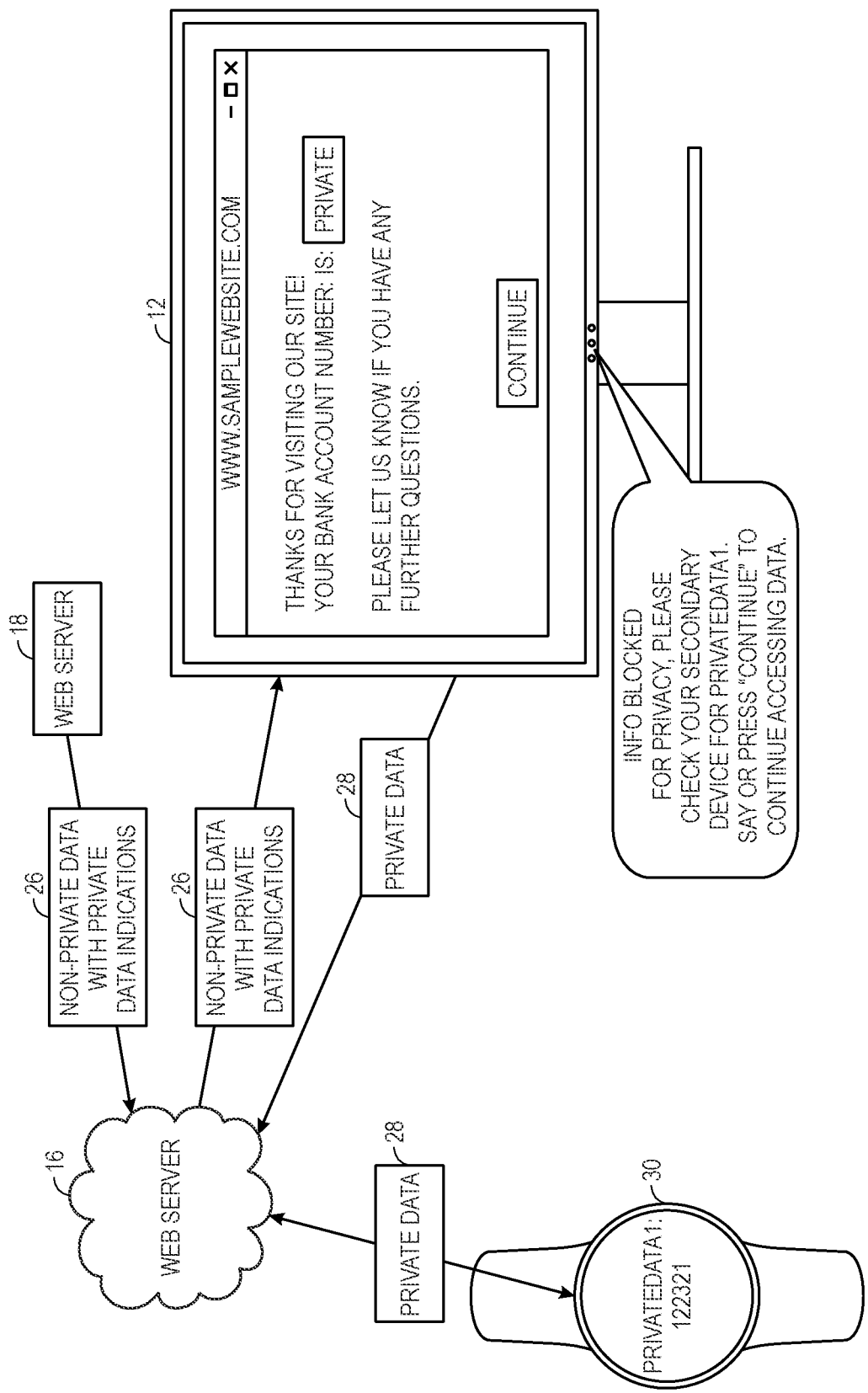
FIG. 6 illustrates an embodiment—which may include embodiments of the system of FIG. 1—of a primary electronic device rerouting private data, in accordance with embodiments described herein.

On a similar note, FIGS. 6 and 7 showcase an embodiment of the process 80 that may utilize embodiments of system 10 of FIG. 1. More specifically, FIG. 6 illustrates an embodiment of a primary electronic device 12 receiving non-private data with private data indications 26 and rerouting private data 28 to a secondary electronic device 30. Additionally, FIG. 7 illustrates an embodiment of responses from a web server 18 and from a primary electronic device 12—which may be embodiments of the system 10 of FIG. 1—in accordance with an embodiment as described in FIG. 6.

In FIG. 6, a web server 18 sends non-private data with private data indications 26 and the private data to a primary electronic device 12 via a network 16. In this embodiment, the primary electronic device 12 may be a computing system such as a desktop computer. As may be appreciated, the computing system may include a presentation device (e.g., large monitor) that may provide a relatively less private presentation of data. Accordingly, it may be desirable to present private data via a secondary electronic device 30, such as via a small, personalized display of a smart watch.

In some embodiments, the primary electronic device 12 may resume providing the less private presentation of data upon receiving a confirmation from the user. That is, the user may provide confirmation that she has read the private data from the secondary electronic device 30. The user may provide the confirmation to the primary electronic device 12 through visual, audible, or haptic mechanisms. For example, in one embodiment the user may provide the confirmation by using a computer peripheral (e.g., a mouse) to click on a confirmation button (e.g., a continue button) displayed on the primary electronic device 12.

In some embodiments, the primary electronic device 12 may resume providing the less private presentation of data upon receiving a confirmation from the user. That is, the user may provide confirmation that she has As shown in FIG. 7, the non-private data with private data indications 26 may be in an HTML format or any other format interpretable by the primary electronic device 12. Further, the indications 27 of private data may be in the form of certain HTML tags or other indicators.

The primary electronic device 12 may identify the indications 27 and generate a secondary electronic device response 28 that includes private data. As shown in FIG. 7, the generated secondary electronic device response 28 may be in an HTML format or any other format interpretable by the secondary electronic device 30. As may be appreciated, because the primary electronic device 12 and the secondary electronic device 30 are oftentimes different types of devices, the primary electronic device 12 may be responsible for converting the private data portion into a secondary electronic device format that is different than the format of the primary electronic device 12 response 26. The primary electronic device 12 may then transmit the secondary electronic device response 28 to the secondary electronic device 30 via the network 16. In this embodiment, the secondary electronic device 30 is depicted as a smartwatch with an electronic display that has a relatively smaller viewable area than that of the primary electronic device 12.

Upon receiving the private data 28 from the primary electronic device 12, the secondary electronic device may parse the private data 28 and visually display the private data 28 to the user. Meanwhile, the primary electronic device 12 may provide a notification to the user (e.g., an audible or visual notification) to refer to the secondary device 30 to view the private data 28. Furthermore, the user may be presented with an opportunity provide an indication to the primary electronic device 12 to provide further non-private data 26. For example, the user may say a certain word to the primary electronic device 12, or the user may click a certain button in or on the primary electronic device 12.

As may be appreciated, it may be desirable to synchronize presentation of the private data by the secondary electronic device 30 with a portion of the presentation of a portion of the data by the primary electronic device 12. For example, in embodiments where the webserver 18 provides the private data to the secondary electronic device 30, the provision of this private data (e.g., in the secondary electronic device response) may be triggered upon reception, at the webserver 18, of an indication 27 from the primary electronic device 12 that the private information should now be presented. To account for network latency, the primary electronic device 12 may provide a pre-mature indication 27 to present the private information and, in some instances, may provide an indication of a time to present the private information (e.g., 10 seconds after reception of the indication 27 by the webserver 12).

In embodiments where the primary electronic device 12 provides the secondary electronic device response, the primary electronic device 12 may provide the secondary electronic device response as the private data indications 27 are reached in the presentation of the other data. For example, the secondary electronic device response may be transmitted as the private data indications 27 are reached during presentation by the primary electronic device 12. In some embodiments, to counteract communication latency, the secondary electronic device response may be provided a set amount of time prior to experiencing the private data indications 27 during the primary electronic device 12 playback and in some embodiments may include a set time window to play back the private data (e.g., 10 seconds from reception by the secondary electronic device 30).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium, comprising computer-readable instructions that, when executed by one or more processors of a computer, cause the computer to:

receive electronic data to be presented by one or more electronic devices;

identify private data contained within the electronic data;

determine, based at least in part upon the identified private data, whether privatized presentation of the private data should be performed;

when the privatized presentation should be performed:

generate a primary electronic device response comprising non-private data of the electronic data and an indication of a location of the private data in the electronic data by inserting one or more tags in the location of the private data in the electronic data;

provide the primary electronic device response to a primary electronic device, wherein the indication of the location of the private data instructs the primary electronic device to refrain from presenting the private data; and cause the private data to be presented to a secondary electronic device tasked with presenting the private data in lieu of the primary electronic device, wherein the private data is presented at a time corresponding to the one or more tags of the primary electronic device response.

2. The tangible, non-transitory, computer-readable medium of claim 1, comprising computer-readable instructions that, when executed by the one or more processors of the computer, cause the computer to:

determine whether privatized presentation of the private data should be performed, by:

identifying a sensitivity level of contents of the private data; and determining that the privatized presentation of the private data should be performed when the sensitivity level of the contents of the private data exceeds a pre-determined threshold.

3. The tangible, non-transitory, computer-readable medium of claim 1, comprising computer-readable instructions that, when executed by the one or more processors of the computer, cause the computer to:

determine whether privatized presentation of the private data should be performed, by:

identifying, via one or more environmental sensors, predicting a number of unintended persons able to receive presentation of the private data via the primary electronic device; and determining that the privatized presentation of the private data should be performed when the number of unintended persons exceeds a pre-determined threshold.

4. The tangible, non-transitory, computer-readable medium of claim 1, comprising computer-readable instructions that, when executed by the one or more processors of the computer, cause the computer to:

determine whether privatized presentation of the private data should be performed, by:

identifying, a type of presentation that will be provided by the primary electronic device; and determining that the privatized presentation of the private data should be performed when the type of presentation is a prescribed type of presentation that is indicated as easier to intercept.

5. The tangible, non-transitory, computer-readable medium of claim 4, wherein the prescribed type of presentation comprises an audible screen reader presentation type.

6. The tangible, non-transitory, computer-readable medium of claim 1, comprising computer-readable instructions that, when executed by the one or more processors of the computer, cause the computer to:

retain the private data in the primary electronic data response, while inserting the one or more tags in the location of the private data in the electronic data.

7. The tangible, non-transitory, computer-readable medium of claim 6, comprising computer-readable instructions that, when executed by the one or more processors of the computer, cause the computer to:

cause the private data to be presented to the secondary electronic device tasked with presenting the private data in lieu of the primary electronic device, by transmitting the private data in the primary electronic device response, enabling the primary electronic device to transmit the private data to the secondary electronic device.

8. The tangible, non-transitory, computer-readable medium of claim 1, comprising computer-readable instructions that, when executed by the one or more processors of the computer, cause the computer to:

generate the primary electronic device response comprising the non-private data of the electronic data and the indication of the location of the private data in the electronic data, by:

replacing the private data with a private data indication, thus removing the private data in the primary electronic data response.

9. The tangible, non-transitory, computer-readable medium of claim 8, comprising computer-readable instructions that, when executed by the one or more processors of the computer, cause the computer to:

cause the private data to be presented to the secondary electronic device tasked with presenting the private data in lieu of the primary electronic device, by transmitting the private data to the secondary electronic device in a secondary electronic device response separate from the primary electronic device response.

10. The tangible, non-transitory, computer-readable medium of claim 1, comprising computer-readable instructions that, when executed by the one or more processors of the computer, cause the computer to:

identify the secondary electronic device from one or more candidate secondary electronic devices, by:

identifying an accessibility presentation setting of the primary electronic device;

identifying a subset of the one or more candidate secondary electronic devices that provide a suitable alternative presentation for the accessibility presentation setting; and selecting the secondary electronic device from the subset of the one or more candidate secondary electronic devices.

11. The tangible, non-transitory, computer-readable medium of claim 1, comprising computer-readable instructions that, when executed by the one or more processors of the computer, cause the computer to:

present the private data at the time corresponding to the one or more tags of the primary electronic device response by causing synchronization of presentation a portion of the non-private data by the primary electronic device with the private data by the secondary electronic device.

12. A privatized presentation system, comprising:
a primary electronic device;
a secondary electronic device; and
a computing device communicatively coupled to the primary electronic device and the secondary electronic device, wherein the computing device comprises:
a communication component configured to receive electronic data;
a processor and a memory device, wherein the processor, when executing instructions stored in the memory device, is configured to:
identify private data contained with the electronic data;
determine, based at least in part upon the identified private data, that a privatized presentation of the private data should be performed;
based upon determining that the privatized presentation should be performed:
generate a primary electronic device response comprising non-private data of the electronic data and an indication of a location of the private data in the electronic data by inserting one or more tags in the location of the private data in the electronic data;
provide the primary electronic device response to the primary electronic device, wherein the indication of the location of the private data instructs the primary electronic device to refrain from presented the private data; and
cause the private data to be presented to the secondary electronic device tasked with presenting the private data in lieu of the primary electronic device, wherein the private data is presented at a time corresponding to the one or more tags of the primary electronic device response.

13. The privatized presentation system of claim 12, wherein the computing device is communicatively coupled to the secondary electronic device through the primary electronic device.

14. The privatized presentation system of claim 13, wherein the processor, when executing the instructions stored in the memory device, is configured to:
retain the private data in the primary electronic data response, while inserting the one or more tags in the location of the private data in the electronic data; and
cause the private data to be presented to the secondary electronic device tasked with presenting the private data in lieu of the primary electronic device at the time corresponding to the one or more tags, by transmitting the private data in the primary electronic device response, enabling the primary electronic device to transmit the private data to the secondary electronic device.

15. The privatized presentation system of claim 12, wherein the processor, when executing the instructions stored in the memory device, is configured to:
generate the primary electronic device response comprising the non-private data of the electronic data and the indication of the location of the private data in the electronic data, by replacing the private data with a private data indication, thus removing the private data in the primary electronic data response; and
cause the private data to be presented to the secondary electronic device tasked with presenting the private data in lieu of the primary electronic device, by transmitting the private data to the secondary electronic device in a secondary electronic device response separate from the primary electronic device response.

16. The privatized presentation system of claim 12, wherein the processor, when executing the instructions stored in the memory device, is configured to:
determine that the privatized presentation of the private data should be performed, by:
identifying a sensitivity level of contents of the private data; and determining that the privatized presentation of the private data should be performed when the sensitivity level of the contents of the private data exceeds a pre-determined threshold; or
identifying, via one or more environmental sensors, predicting a number of unintended persons able to receive presentation of the private data via the primary electronic device; and determining that the privatized presentation of the private data should be performed when the number of unintended persons exceeds a pre-determined threshold; or
identifying, a type of presentation that will be provided by the primary electronic device; and determining that the privatized presentation of the private data should be performed when the type of presentation is a prescribed type of presentation that is indicated as easier to intercept; or
any combination thereof.

17. The privatized presentation system of claim 12, wherein the processor, when executing the instructions stored in the memory device, is configured to:
identify the secondary electronic device from one or more candidate secondary electronic devices, by:
identifying an accessibility presentation setting of the primary electronic device;
identifying a subset of the one or more candidate secondary electronic devices that provide a suitable alternative presentation for the accessibility presentation setting; and
selecting the secondary electronic device from the subset of the one or more candidate secondary electronic devices.

18. A computer-implemented method, comprising:
receiving electronic data to be presented by one or more electronic devices;
identifying private data contained within the electronic data;
determining, based at least in part upon the identified private data, that a privatized presentation of the private data should be performed;
based upon determining that the privatized presentation should be performed:
generating a primary electronic device response comprising non-private data of the electronic data and an indication of a location of the private data in the electronic data by inserting one or more tags in the location of the private data in the electronic data;
providing the primary electronic device response to a primary electronic device, wherein the indication of the location of the private data instructs the primary electronic device to refrain from presenting the private data; and
causing the private data to be presented to a secondary electronic device tasked with presenting the private data in lieu of the primary electronic device, wherein the private data is presented at a time corresponding to the one or more tags of the primary electronic device response.

19. The computer-implemented method of claim 18, comprising:
- retaining the private data in the primary electronic data response, while inserting one or more tags in the location of the private data in the electronic data; and causing the private data to be presented to the secondary electronic device tasked with presenting the private data in lieu of the primary electronic device at the time corresponding to the one or more tags of the primary electronic device response, by transmitting the private data in the primary electronic device response, enabling the primary electronic device to transmit the private data to the secondary electronic device; or
- generating the primary electronic device response comprising the non-private data of the electronic data and the indication of the location of the private data in the electronic data, by replacing the private data with a private data indication, thus removing the private data in the primary electronic data response; and causing the private data to be presented to the secondary electronic device tasked with presenting the private data in lieu of the primary electronic device, by transmitting the private data to the secondary electronic device in a secondary electronic device response separate from the primary electronic device response.

20. The computer-implemented method of claim 18, comprising:
- determining that the privatized presentation of the private data should be performed, by:
  - identifying a sensitivity level of contents of the private data; and determining that the privatized presentation of the private data should be performed when the sensitivity level of the contents of the private data exceeds a pre-determined threshold; or
  - identifying, via one or more environmental sensors, predicting a number of unintended persons able to receive presentation of the private data via the primary electronic device; and determining that the privatized presentation of the private data should be performed when the number of unintended persons exceeds a pre-determined threshold; or
  - identifying, a type of presentation that will be provided by the primary electronic device; and determining that the privatized presentation of the private data should be performed when the type of presentation is a prescribed type of presentation that is indicated as easier to intercept; or
- any combination thereof.

* * * * *